Patented Jan. 23, 1945

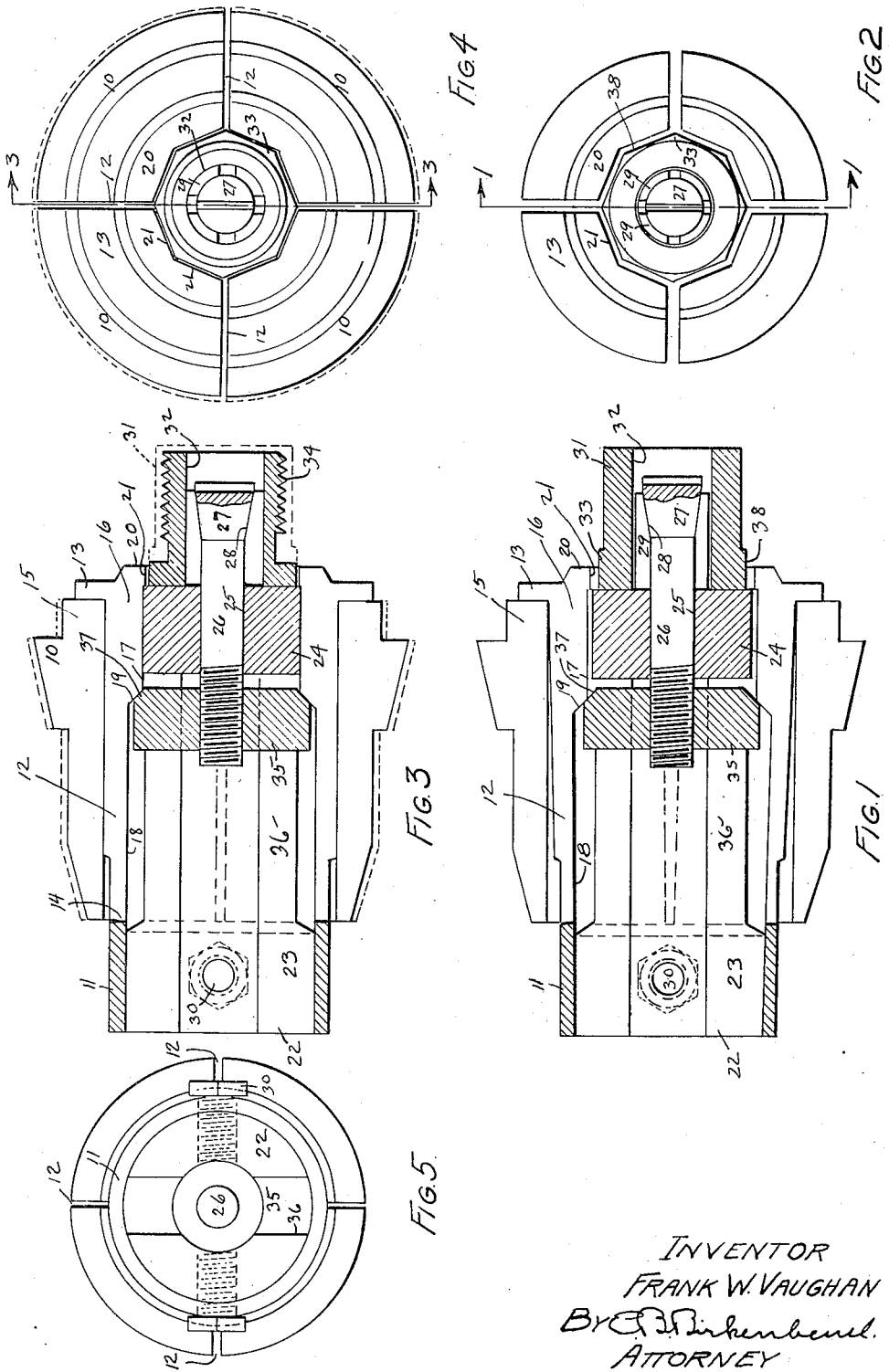

2,367,703

UNITED STATES PATENT OFFICE 2,367,703

WORK HOLDER FOR TURRET LATHES

Frank W. Vaughan, Portland, Oreg., assignor of one-half to Harry R. Vaughan, Portland, Oreg.

Application May 10, 1943, Serial No. 486,297

3 Claims. (Cl. 279—2)

This invention relates generally to machine tools, and particularly to a work holder for turret lathes.

The main object of this invention is to combine the advantages of a contracting driving socket and an expanding work centering mandrel.

The second object is to produce a device of the class described which will be useful in collet chucking turret lathes as well as universal three-jaw chucks, independent four-jaw chucks, or as a jig in a vice.

The third object is to effect an economy of time in the machining of small parts such as gland nuts which are tubular in form, externally threaded at one end, and flanged at the other.

The fourth object is to construct a device of the class described wherein the closing of the chuck automatically expands the centering mandrel and closes the socket sufficiently to insure a positive driving action.

The fifth object is to provide an adjustment for the parts whereby a variation of several thousandths of an inch in the work may be accommodated.

The sixth object is to so construct a device that the socket may be large enough to take care of irregularities without destroying the driving action thereof.

I accomplish these and other objects in the manner set forth in the following specification, as illustrated in the accompanying drawing, in which:

Fig. 1 is a longitudinal section through the device, taken alone the line 1—1 in Fig. 2.

Fig. 2 is an end elevation of Fig. 1, in which Figs. 1 and 2 both show the blank placed on the mandrel ready for centering.

Fig. 3 is a longitudinal view taken along the line 3—3 in Fig. 4.

Fig. 4 is a front end elevation of Fig. 3; Figs. 3 and 4 showing the work centered on the mandrel and the socket in driving relation thereto.

Fig. 5 is a rear end elevation of Fig. 3.

Similar numerals refer to similar parts throughout the several views.

Referring in detail to the drawing, there is shown the jaws 10 of a chuck which may be closed in any convenient manner. Within the jaws 10 is a sleeve 11 provided with slots 12 which in this instance are shown as quartering the sleeve from the flanged end 13 to the slotted end 14. The flanged end 13 bears against the shoulders 15 of the jaw members 10.

The slotted end 16 of the sleeve 11 is reduced in diameter to form a cylindrical opening 17 which is somewhat smaller than the opening 18 of the sleeve 11. The portions 19 of the openings 17 and 18 are inclined with relation to the sleeve axis. The extreme end 20 of the flange 13 is provided with the octagonal faces 21.

Disposed within the sleeve 11 is the slotted plug 22 whose enlarged end 23 fits into the opening 18, and the reduced end 24 fits into the opening 17 when the jaws 10 are compressed or closed by an outside force—that is, the jaws 16 close tightly upon the member 24.

Extending through the member 24 is an opening 25 through which extends a screw 26 whose tapering end 27 occupies a tapering recess 28 in the jaws 29. The jaws 29 are preferably an integral part of the member 24.

The members 11 and 23 are held in fixed relationship by means of the screws 30 which extend through the sleeve 11.

On the threaded end 34 of the screw 26 is placed the elongated nut 35 which is slidable within the slot 36 formed across the member 23 and extending into the reduced portion 24. The nut 35 is provided with a chamfered corner 37 which engages the corner 19.

It will be noted in Fig. 1 that the work 31 is free on the mandrel 29, but when the jaws 10 are closed it moves the face 19 against the junction face 37.

The operation of the device is as follows:

Assuming a blank 31 has been drilled to form the opening 32 and finished on the flanged end 33, it is slipped into position on the mandrel jaws 29 as shown in Fig. 1, and the jaws 10 are made to contract upon the slotted end of the sleeve 11 as shown in Fig. 3.

It will be seen that the slotted end 16 will now converge upon the reduced end 24 and the inclined face 19 engage the face 37 causing the nut 35 to slide, drawing with it the screw 26 and cause its conical head 27 to expand the members 29 into the opening 32 of the work 31. At the same time it will be noted that the octagonal sides 21 of the member 16 are nearer to the octagonal faces 38 of the member 31 than they were in the position shown in Fig. 1, but yet do not touch the faces 33. They are, however, close enough to drive the work, which is all that is necessary, leaving the members 29 to center the work.

As stated, the expansion of the mandrel is adjusted by turning the screw 26 by means of a screw driver. By making the fit of the screw 26 in the nut 35 a close one, the plunger remains in adjustment and yet makes possible the accommodation of several thousandths of an inch in variation in the diameter of the opening.

I claim:

1. The combination of a sleeve having an internal shoulder, one end of which is slotted and contractible, a plug disposed within said sleeve having one end thereof slotted and secured to the non-contractible end of said sleeve, the unslotted end of said plug occupying a position within the contractible end of said sleeve, said plug having an expandible arbor formed thereon projecting from the contractible end of said sleeve, an expanding screw passing through said arbor and the closed end of said plug into the slot thereof, a nut in said slot mounted on said screw, said nut being held against rotation in said slot and having the outermost edge thereof beveled to engage said internal shoulder of said contractible sleeve members and to be moved longitudinally thereby, and thereby slide said screw and expand said arbor.

2. A device of the class described consisting of a collapsible sleeve having a nut driving socket formed in one end thereof, having a plug mounted at the inner end of said socket from which projects an expanding arbor extending axially through said socket, an expanding screw passing through said arbor and plug, a nut mounted on said screw, and means for sliding said nut actuated by the collapse of said sleeve in a manner to expand said mandrel into an opening in the work while the socket contracts toward the work for the purpose of driving same.

3. A device of the class described consisting of an elongated plug having a radial slot formed therethrough from one end along the major portion of its length, a nut slidably mounted in said slot, an expandible mandrel projecting from one end of said plug, said mandrel having a conical recess therein, a conical head expanding screw having its head in said recess and passing through said mandrel plug, and nut whereby a sliding movement of said nut will slide said screw and expand said mandrel, a collapsible socket sleeve surrounding said plug having an inclined interior face adapted to engage said nut in a manner to slide same when the socket is compressed, and a chuck for collapsing said socket sleeve.

FRANK W. VAUGHAN.